US012321029B2

(12) United States Patent
Marru et al.

(10) Patent No.: US 12,321,029 B2
(45) Date of Patent: Jun. 3, 2025

(54) OPTICAL FIBER CABLE WITH FLEXIBLE WRAPPING TUBES

(71) Applicant: Sterlite Technologies Limited, Haryana (IN)

(72) Inventors: Pramod Marru, Haryana (IN); Kawarpreet Singh, Haryana (IN)

( * ) Notice: Subject to any disclaimer, the term of this patent is extended or adjusted under 35 U.S.C. 154(b) by 230 days.

(21) Appl. No.: 18/147,250

(22) Filed: Dec. 28, 2022

(65) Prior Publication Data

US 2023/0236374 A1 Jul. 27, 2023

(30) Foreign Application Priority Data

Jan. 13, 2022 (IN) ............................ 202211002127

(51) Int. Cl.
*G02B 6/44* (2006.01)

(52) U.S. Cl.
CPC ............ *G02B 6/443* (2013.01); *G02B 6/441* (2013.01); *G02B 6/4434* (2013.01); *G02B 6/4482* (2013.01)

(58) Field of Classification Search
CPC ...... G02B 6/441; G02B 6/443; G02B 6/4434; G02B 6/4482
See application file for complete search history.

(56) References Cited

U.S. PATENT DOCUMENTS 7,113,680 B2 * 9/2006 Hurley .................. G02B 6/441 385/112
9,581,779 B2 * 2/2017 Hudson, II .......... G02B 6/4433
10,705,305 B2 * 7/2020 Kaneko .................. G02B 6/441
11,442,236 B2 * 9/2022 Blazer .................. G02B 6/4403
2011/0110635 A1 * 5/2011 Toge ..................... G02B 6/441 385/102
2021/0072477 A1 * 3/2021 Kimura .................. G02B 6/441
2021/0382255 A1 * 12/2021 Namazue ............ G02B 6/4431
2022/0326467 A1 * 10/2022 Watanabe ............. G02B 6/448

FOREIGN PATENT DOCUMENTS

FR 2725041 A1 * 3/1996 ......... G02B 6/02009
JP 2013254001 A * 12/2013 ............... G02B 6/44
JP 2014016529 A * 1/2014 ............... G02B 6/44

OTHER PUBLICATIONS

English Translation for FR-2725041-A1, 6 pages. (Year: 1996).*

* cited by examiner

*Primary Examiner* — Daniel Petkovsek
(74) *Attorney, Agent, or Firm* — Steven R. Fairchild

(57) ABSTRACT

The present invention relates to an optical fiber cable (400, 500) with flexible wrapping tubes comprising a plurality of unit bundles packed in the optical fiber cable (400, 500), where each unit bundle has a plurality of optical fibers (106) enveloped by a non-extruded film (100), and at least one of the unit bundles takes a non-circular shape in a packed configuration and a sheath (404, 504) enveloping the plurality of unit bundles. Each unit bundle is formed by wrapping the non-extruded film (100) around the optical fibers (106) such that width edges of the non-extruded film (100) overlap along the length of the optical fiber cable (400, 500). Alternatively, the non-extruded film (100) is wrapped around the plurality of optical fibers (106) helically.

20 Claims, 5 Drawing Sheets

100
104
102
100
106
400
402
100
106
404
402

OPTICAL FIBER CABLE WITH FLEXIBLE WRAPPING TUBES

CROSS REFERENCE TO RELATED APPLICATION

This application claims the benefit of Indian Patent Application number 202211002127, entitled "OPTICAL FIBER CABLE WITH FLEXIBLE WRAPPING TUBES" filed by the applicant on Jan. 13, 2022, which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

Embodiments of the present invention relate to the field of optical fiber cables manufacturing equipment and more particularly, relates to an optical fiber cable with flexible wrapping tube.

BACKGROUND OF THE INVENTION

A communication network is a large distributed system for receiving information (signal) and transmitting the information to a destination. Over the past few decades the demand for communication access has dramatically increased. Being a critical component of a modern communication network across the globe, optical fiber cables are widely used for communication to meet the increasing demands. Optical fiber cables utilize optical fibers to transmit signals such as voice, video, image, data or information.

Optical fibers are strands of glass fiber processed so that light beams transmitted through the glass fiber are subject to total internal reflection wherein a large fraction of the incident intensity of light directed into the fiber is received at the other end of the fiber.

An optical fiber ribbon comprises two or more parallel optical fibers that are joined together along their lengths. A material commonly referred to as a matrix adheres the fibers together. In a "flat" or "encapsulated" optical fiber ribbon, the parallel optical fibers may be fully encapsulated within the matrix material. For high density optical fiber cables, intermittently bonded ribbons (IBRs) are broadly used, wherein the IBRs are bound/bundled together by coloured binder yarns for easy identification of optical fibers and the bunched IBRs are put together to form the optical fiber cables.

Loose tube fiber optic cables typically use crisscrossing binder yarns that are counter-helically wrapped about a core of the cable to constrain stranded buffer tubes containing optical fibers, particularly with arrangements of the buffer tubes that include reverse-oscillatory winding patterns of the buffer tubes where the lay direction of the buffer tubes periodically reverses around a (straight) central strength member along the length of the core.

Typically, the binder yarns are applied with tension directly on the IBRs, which can increase attenuation of the optical fibers and hence reduces optical performance of the optical fiber cables. Additionally, the binder yarns can also unwind thereby creating difficulty in identification of the optical fibers at the end of preparation.

One way to address the aforesaid drawbacks is to use wrap/wrapping tubes. Currently, there are a few prior arts employing wrap/wrapping tubes for intermittently bonded ribbons (IBRs).

Japanese patent application no. JP5789630B2 titled "Optical unit and optical fiber cable" discloses an optical fiber wrapped with the film.

European patent application no. EP0733925B1 titled "Method of forming a sheath of a fiber optical unit and fiber optical cable comprising fibre optical units having such a sheath" discloses wrapping of a group of fibers by a film with a view to producing an optical fiber module.

However, there are a number of drawbacks in the current technologies providing wrap/wrapping tubes. In particular, the conventional wrapping tubes are wound around loose optical fibers, i.e., the scope and use of the conventional wrapping tubes are limited to loose optical fibers only. Due to this limitation, optical fiber cables with high filling coefficient like IBRs cannot be achieved. Moreover, other conventional wrapping tubes are extruded over the optical fibers and are not flexible, thereby imparting mechanical stress/tension and heat stress on the optical fibers, which further results in degradation of the optical performance as well as increase in the attenuation.

Accordingly, to overcome the disadvantages of the prior arts, there is a need for a technical solution that overcomes the above-stated limitations in the prior arts. The present invention provides an optical fiber cable with high filling coefficient, improved optical performance and reduced attenuation.

SUMMARY OF THE INVENTION

Embodiments of the present invention provide an optical fiber cable, comprising a plurality of unit bundles packed in the optical fiber cable, each unit bundle has a plurality of optical fibers enveloped by a non-extruded film, wherein at least one of the plurality of unit bundles takes a non-circular shape in a packed configuration; and a sheath enveloping the plurality of unit bundles.

In accordance with an embodiment of the present invention, each unit bundle is formed by wrapping the non-extruded film around the plurality of optical fibers.

In accordance with an embodiment of the present invention, the non-extruded film is wrapped around the plurality of optical fibers such that width edges of the non-extruded film overlap along length of the optical fiber cable. In particular, the non-extruded film is wrapped around the plurality of optical fibers helically. Moreover, the non-extruded film has a width in a range of 5 mm to 100 mm. Further, the non-extruded film has an elasticity modulus less than or equal to 5 GPa. Furthermore, the non-extruded film is coated with at least one of a water blocking material, a water absorbent material, a fire retardant material, a low friction material and a cushioning material.

In accordance with an embodiment of the present invention, each of the plurality of unit bundles has a filling coefficient in a range of 0.5 to 0.7. In particular, the plurality of unit bundles is arranged in the optical fiber cable with a packing density in a range of 0.3 to 0.6.

In accordance with an embodiment of the present invention, the optical fiber cable has one or more elements like binders, water blocking tape, fire retardant tape, metal tape, rip cords, water swellable yarns, water blocking gel, strength yarns, dielectric armouring, ECCS (Electro Chrome Coated Steel) tape.

In accordance with an embodiment of the present invention, the plurality of optical fibers has bonded and unbonded regions along a length of adjacent optical fibers.

In accordance with an embodiment of the present invention, an overlap ratio of the non-extruded film is in a range of 0.05 to 0.3. In particular, the overlap ratio is a ratio of an overlapped area and total area of the non-extruded film.

The foregoing objectives of the present invention are attained by employing an optical fiber cable with flexible wrapping tubes. These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Figure 1:
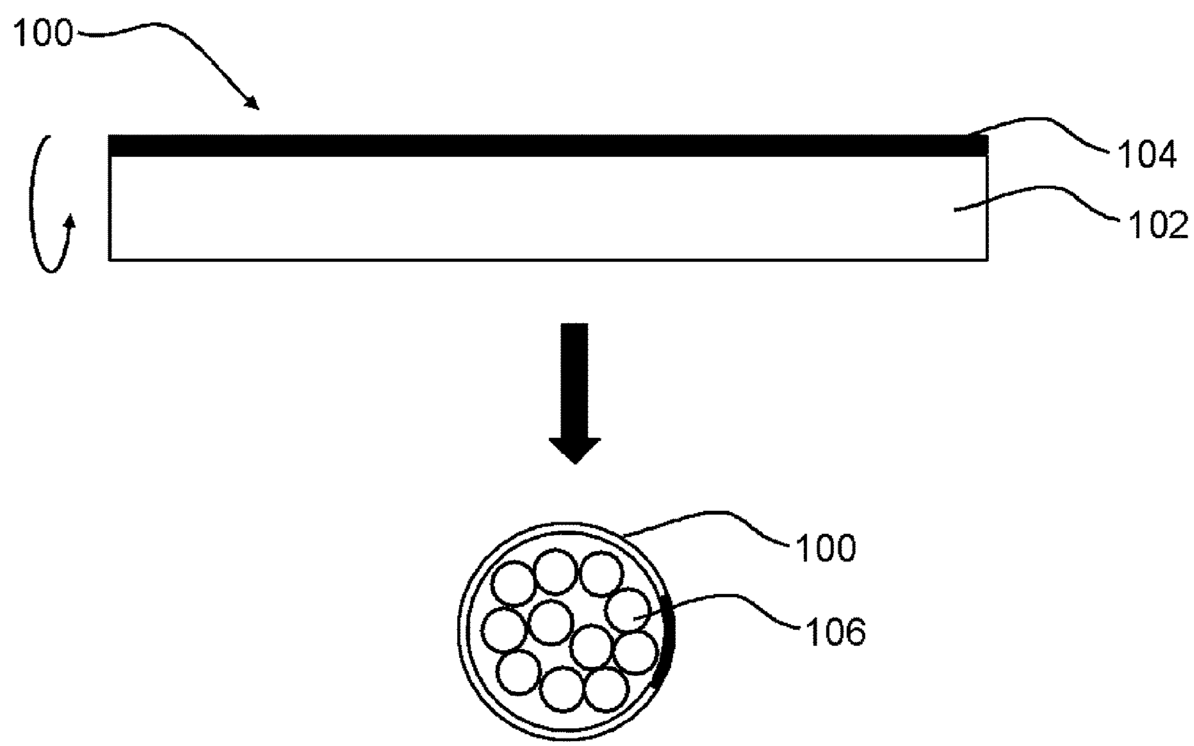
FIG. 1 is a snapshot illustrating a non-extruded film in accordance with an embodiment of the present invention.

Non-extruded film—100
First layer—102
Second layer—104
Plurality of optical fibers—106
Overlapping—108
Optical fiber cable—400, 500
One or more strength members—402
Central strength member—502
Sheath—404, 504

It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE PREFERRED EMBODIMENTS

The principles of the present invention and their advantages are best understood by referring to FIG. 1 to FIG. 5. In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present disclosure:

Optical fiber refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or other suitable category. The ITU.T stands for International Telecommunication Union-Telecommunication Standardization Sector, is one of the three sectors of the ITU.

ITU is the United Nations specialized agency in the field of telecommunications and is responsible for studying technical, operating and tariff questions and issuing recommendations on them with a view to standardizing telecommunications on a worldwide basis.

Young's modulus is a property of a material that tells how easily it can stretch and deform and is defined as a ratio of tensile stress to tensile strain, where stress is the amount of force applied per unit area and strain is extension per unit length and the elasticity is an ability of an object to resist a distorting influence or force and to return to its original size and shape when that influence or force is removed.

Filling coefficient is a ratio of cross-sectional area of all the optical fibers inside a unit bundle to inner cross-sectional area of the non-extruded film.

Packing density is a ratio of cross-sectional area of all the optical fibers to inner cross-sectional area of the sheath.

Sheathing is a process of squeezing a molten sheathing material through a funnel of a die as a core runs through the center at a high temperature (preferably more than 100° C.).

Crush resistance is an ability of a cable to withstand and/or recover from the effects of a compressive force.

FIG. 1 is a snapshot illustrating a non-extruded film in accordance with an embodiment of the present invention. The non-extruded film 100 comprises a first layer 102 and a second layer 104. In particular, the first layer 102 may be a tape layer and may be made up of polyolefins, polyesters or polypropylene. Alternatively, the first layer 102 may be made of any other suitable material. Moreover, the second layer 104 may be an adhesive layer such as adhesive coating and may be made from polyurethane, acrylic, rubber, glue, for example. Further, the second layer 104 may have a width in a range of 1 mm to 20 mm.

A plurality of optical fibers 106 are wrapped in the first layer 102 such that on one edge, the second layer 104 is applied extending longitudinally along the length of the first layer 102, which when formed in a cylindrical shape adheres to other edge of the first layer 102 thus forming a wrapping tube containing the plurality of optical fibers 106. Particularly, the first layer 102 may be a colored layer that helps in easy identification of the plurality of optical fibers 106 and the second layer may be applied on the first layer 102 before wrapping (offline) or may be applied during wrapping process (online).

In accordance with an embodiment of the present invention, the non-extruded film 100 acts like the wrapping tube that uses the second layer 104 to wrap the first layer 102 and form the wrapping tube. In particular, the non-extruded film 100 may be coated with, such as, but not limited to, a water blocking material, a water absorbent material like super absorbent polymer, a fire retardant material like inorganic fillers, a low friction material and a cushioning material. Moreover, the non-extruded film 100 is not extruded over the plurality of optical fibers 106 but wrapped around them utilising the second layer 104, thus is flexible and easy to manufacture and does not pose any stress on the plurality of optical fibers 106 contained within.

Figure 2:
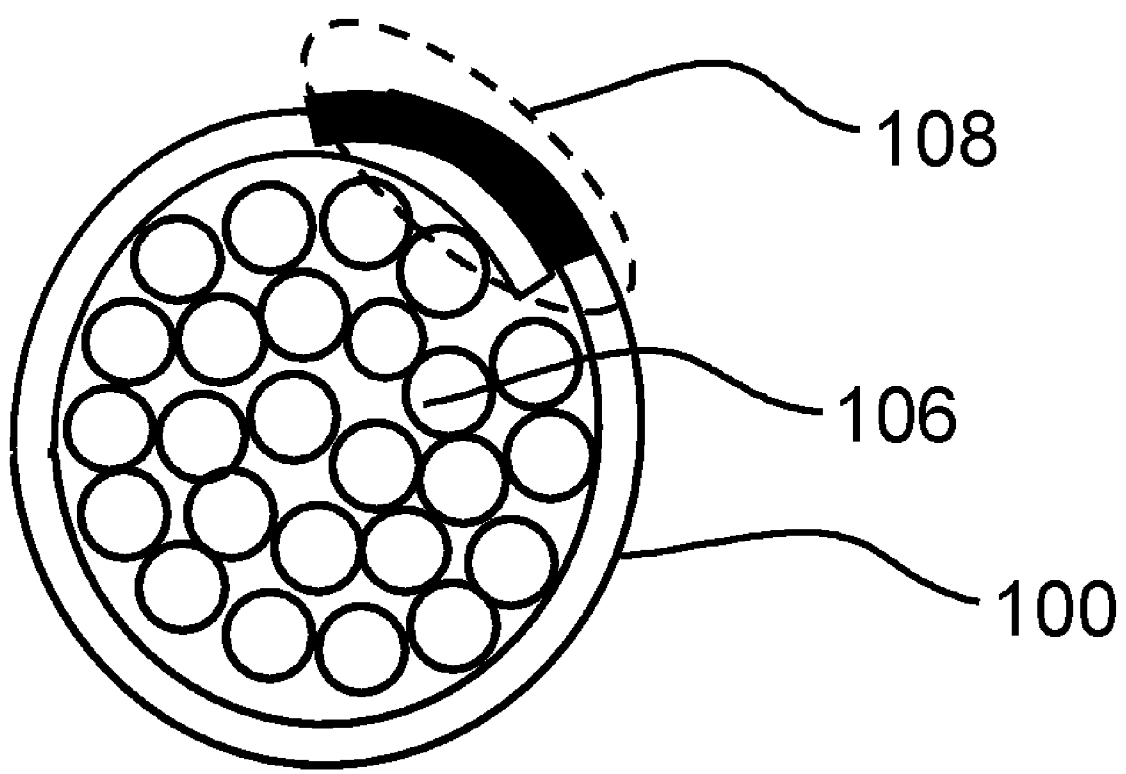
FIG. 2 is a snapshot illustrating overlapping portions of the non-extruded film in accordance with an embodiment of the present invention.

FIG. 2 is a snapshot illustrating overlapping portions of the non-extruded film in accordance with an embodiment of the present invention. The non-extruded film 100 may have a rectangular shape (as shown in FIG. 1) that surrounds the plurality of optical fibers 106 by overlapping width ends/edges of the non-extruded film 100 along a length of an optical fiber cable. In particular, the overlapping 108 may have an overlap ratio in a range of 0.05 to 0.3 as below 0.05, the non-extruded film 100, when wrapped, may open up during manufacturing or handling and beyond 0.3, the cost and thickness of the non-extruded film 100 will be increased. Moreover, the overlap ratio may be defined as a ratio of an overlapped area and total area of the non-extruded film 100.

Figure 3:
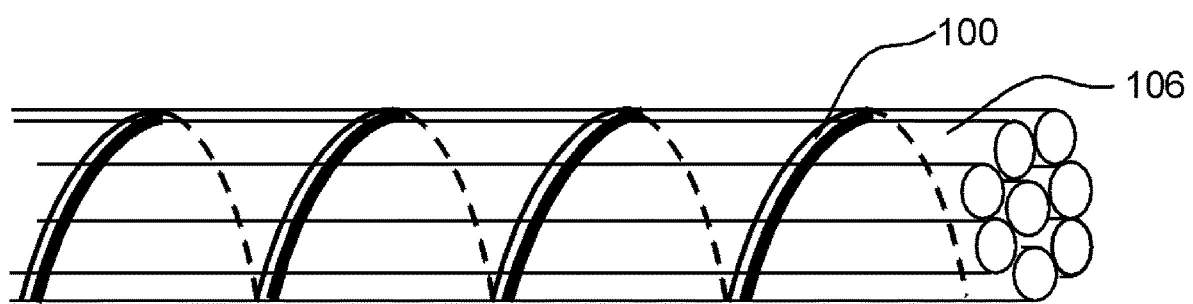
FIG. 3 is a snapshot illustrating a helical wrapping of the non-extruded film in accordance with an embodiment of the present invention.

FIG. 3 is a snapshot illustrating a helical wrapping of the non-extruded film in accordance with an embodiment of the present invention. The non-extruded film 100 may be wrapped around the plurality of optical fibers 106 helically. In particular, the helically wrapped non-extruded film 100 may not have the second layer 104.

In accordance with an embodiment of the present invention, the non-extruded film 100 may be characterized by a width and Young's modulus (or modulus of elasticity). In particular, the width may be in a range of 5 mm to 100 mm and the Young's modulus may be less than or equal to 5 GPa, so that the non-extruded film 100 can be flexible enough and can take a deformed non-circular shape to enhance packaging/packing density of the optical fiber cable. Alternatively, the width and Young's modulus may vary.

Figure 4:
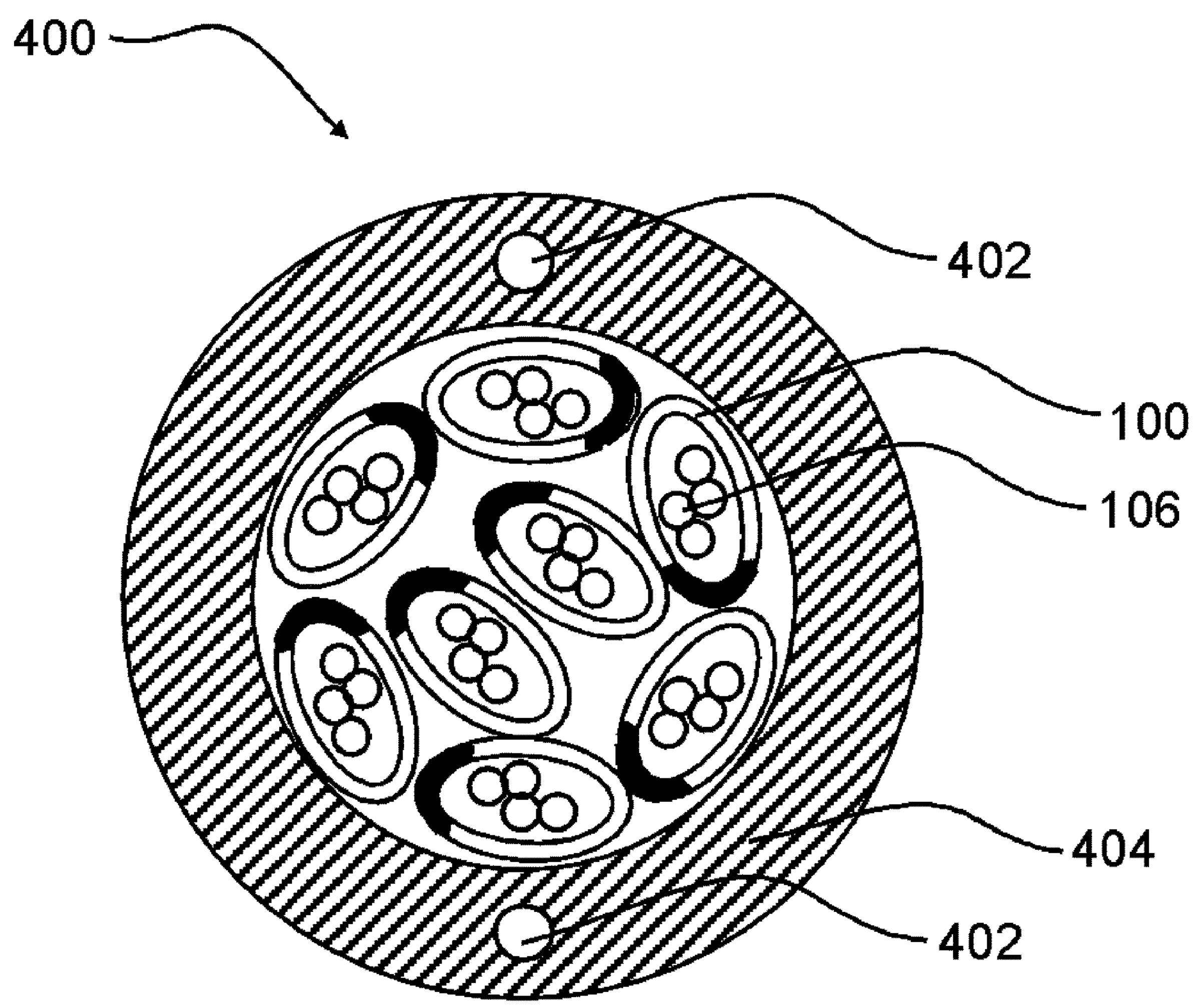
FIG. 4 is a snapshot illustrating an exemplary optical fiber cables having non-extruded films in accordance with an embodiment of the present invention.
Figure 5:
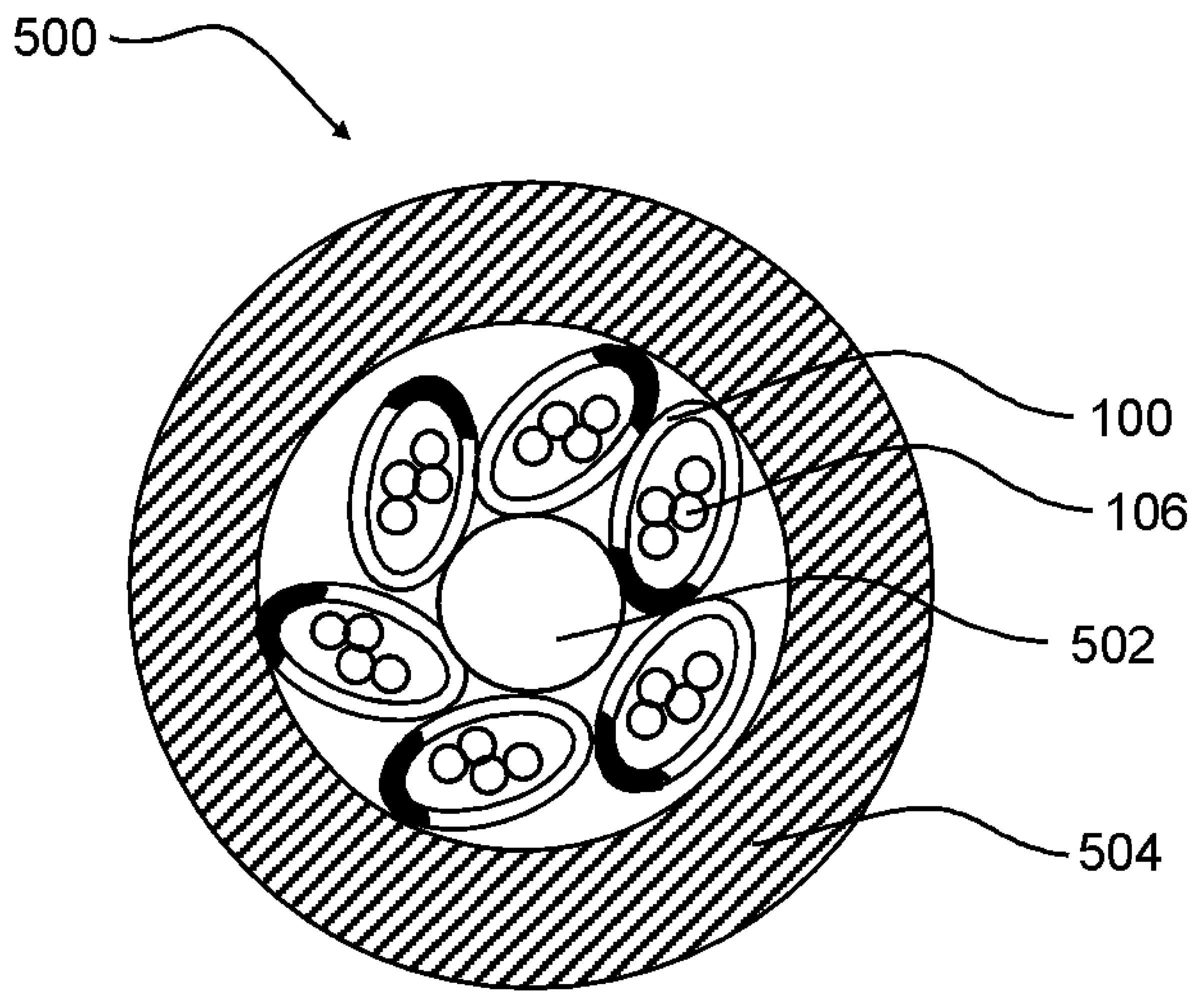
FIG. 5 is a snapshot illustrating an exemplary optical fiber cables having non-extruded films in accordance with another embodiment of the present invention.

FIG. 4 and FIG. 5 are snapshots illustrating an exemplary optical fiber cable having non-extruded films in accordance with one or more embodiments of the present invention. The optical fiber cable 400, 500 include the plurality of optical fibers 106, the plurality of non-extruded films 100 and a sheath 404, 504. In particular, the plurality of optical fibers 106 may be present in form of, but not limited to, a group of loose optical fibers, a group of optical fiber ribbons or a stack of optical fiber ribbons, a group of rollable ribbons, a group of corrugated ribbons, a group of partially/intermittently bonded optical fiber ribbons, a group of flat ribbons.

In accordance with an embodiment of the present invention, the optical fiber may be a bend insensitive fiber that has less degradation in optical properties or less increment in optical attenuation during bending of the optical fiber cable. Thus, the bend insensitive fiber further helps to maintain the optical properties during multiple winding/unwinding operations of the optical fiber cable. The optical fiber may be coloured fiber.

In accordance with an embodiment of the present invention, the optical fiber may be a single-core optical fiber, a multi-core optical fiber, a single-mode optical fiber, a multimode optical fiber or the like. The single mode optical fiber carries only a single mode of light and the multimode optical fiber carries multiple modes of light to propagate. The multicore optical fibers consist of multiple cores as opposed to the single-core optical fiber that comprise only a single core.

In accordance with an embodiment of the present invention, the plurality of optical fibers 106 may have bonded and unbonded regions along a length of adjacent optical fibers. The plurality of optical fibers 106 may be enveloped by the plurality of non-extruded films 100. Particularly, each of the plurality of non-extruded films 100 may envelop the plurality of optical fibers 106, thereby forming a plurality of unit bundles, where at least one of the plurality of unit bundles may take a non-circular shape in a packed configuration. Moreover, each of the plurality of non-extruded films 100 may be wrapped around the plurality of optical fibers 106 such that width edges of each of the plurality of non-extruded films 100 overlap along length of the optical fiber cable 400, 500 (as shown in FIG. 2). Alternatively, each of the plurality of non-extruded films 100 may be wrapped around the plurality of optical fibers 106 helically (as shown in FIG. 3). It may be noted that the details of each of the plurality of non-extruded films 100 is already provided in conjunction with FIG. 1, FIG. 2 and FIG. 3.

In accordance with an embodiment of the present invention, each of the plurality of unit bundles may have a filling coefficient in a range of 0.5 to 0.7. Alternatively, the filling coefficient may vary.

In accordance with an embodiment of the present invention, the plurality of unit bundles may be arranged in the optical fiber cable 400, 500 such that a packing density is in a range of 0.3 to 0.6. Alternatively, the packing density may vary.

In accordance with an embodiment of the present invention, the plurality of unit bundles may be enveloped by the sheath 404, 504. In particular, the sheathing material for the sheath may include, but not limited to, polyvinylchloride, polyethylene (such as High Density Polyethylene (HDPE), Medium Density Polyethylene, and Low Density Polyethylene), polyurethane, thermoplastic rubber/elastomer, thermoplastic chlorinated polyethylene or combination thereof.

The sheath 404 may comprise one or more strength members 402 (as shown in FIG. 4) embedded that may provide mechanical strength and stiffness to the optical fiber cable 400. In particular, one or more strength members 402 may be made of, but not limited to, FRP (Fiber Reinforced Plastic), ARP (Aramid Reinforced Plastic) or any other suitable dielectric/strength material. Moreover, the one or more strength members 402 may have a round shape, a flat shape or any other suitable shape. Further, the one or more strength members 402 may be coated with EAA (Ethylene Acrylic Acid) or EVA (Ethylene-Vinyl Acetate) coating for better adhesion with the sheath 404, i.e., to enhance the adhesion of the one or more strength members with the sheath 404.

Alternatively, a strength member may be present in the form of a central strength member 502 (as shown in FIG. 5 in the optical fiber cable 500) where each of the plurality of unit bundles may be stranded around the central strength member 502. In particular, the central strength member 502 may provide mechanical strength and stiffness to the optical fiber cable 500. Moreover, the central strength member 502 may provide enhanced break load and excellent crush protection/resistance performance. Further, the central strength member 502 may be made of, but not limited to, FRP (Fiber Reinforced Plastic), ARP (Aramid Reinforced Plastic) or any other suitable dielectric/strength material. The central strength member 502 may have a round shape, a flat shape or any other suitable shape.

It may be noted that the optical fiber cable 400, 500 may contain one or more elements depending upon requirement and implementation. Non-limiting examples of the one or more elements are binders, water blocking tape, fire retardant tape, metal tape, rip cords, water swellable yarns, water blocking gel, strength yarns, dielectric armouring, ECCS (Electro Chrome Coated Steel) tape etc.

Although FIG. 4 and FIG. 5 show various elements of the optical fiber cable 400, 500, but it is to be understood that other alternatives are not limited thereon. In other implementations, the optical fiber cable 400, 500 may include less or more number of elements/components. Further, the labels or names of the elements/components are used only for illustrative purpose and do not limit the scope of the present disclosure. The shape and size of the various elements in the optical fiber cable 400, 500 do not limit the scope of the present disclosure.

Advantageously, the present invention provides an optical fiber cable with flexible wrapping tubes (i.e., non-extruded film) that can hold optical fibers without imparting any stress, thereby improving optical performance and reducing attenuation of the optical fibers and to provide the optical fiber cable with high filling coefficient. Further, the one or more strength members may provide enhanced tensile strength and excellent crush protection/resistance performance.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

We claim:

1. An optical fiber cable, comprising:

a plurality of unit bundles packed in the optical fiber cable, each unit bundle has a plurality of optical fibers enveloped by a non-extruded film, wherein at least one of the plurality of unit bundles takes a non-circular shape in a packed configuration; and a sheath enveloping the plurality of unit bundles;

wherein the non-extruded film comprises a first layer that is a tape layer and a second layer that is an adhesive layer.

2. The optical fiber cable as claimed in claim 1, wherein each unit bundle is formed by wrapping the non-extruded film around the plurality of optical fibers.

3. The optical fiber cable as claimed in claim 2, wherein the non-extruded film is wrapped around the plurality of optical fibers such that width edges of the non extruded film overlap along length of the optical fiber cable.

4. The optical fiber cable as claimed in claim 2, wherein the non-extruded film is wrapped around the plurality of optical fibers helically.

5. The optical fiber cable as claimed in claim 1, wherein the non-extruded film has a width in a range of 5 mm to 100 mm.

6. The optical fiber cable as claimed in claim 1, wherein the non-extruded film has an elasticity modulus less than or equal to 5 GPa.

7. The optical fiber cable as claimed in claim 1, wherein each of the plurality of unit bundles has a filling coefficient in a range of 0.5 to 0.7.

8. The optical fiber cable as claimed in claim 1, wherein the optical fiber cable has one or more binder elements, water blocking tape, fire retardant tape, metal tape, rip cords, water swellable yarns, water blocking gel, strength yarns, dielectric armouring, ECCS (Electro Chrome Coated Steel) tape.

9. The optical fiber cable as claimed in claim 1, wherein the plurality of unit bundles is arranged in the optical fiber cable with a packing density in a range of 0.3 to 0.6.

10. The optical fiber cable as claimed in claim 1, wherein the plurality of optical fibers has bonded and unbonded regions along a length of adjacent optical fibers.

11. The optical fiber cable as claimed in claim 1, wherein an overlap ratio of the non extruded film is in a range of 0.05 to 0.3.

12. The optical fiber cable as claimed in claim 1, wherein an overlap ratio is a ratio of an overlapped area and total area of the non-extruded film.

13. The optical fiber cable as claimed in claim 1, wherein the non-extruded film is coated with at least one of a water blocking material, a water absorbent material, a fire retardant material, a low friction material and a cushioning material.

14. The optical fiber cable as claimed in claim 1, sheath (404) comprises one or more strength members (402).

15. The optical fiber cable as claimed in claim 1, sheath (504) comprises a central strength members.

16. The optical fiber cable as claimed in claim 15, wherein the central strength members is made of FRP (Fiber Reinforced Plastic), or ARP (Aramid Reinforced Plastic).

17. The optical fiber cable as claimed in claim 14, wherein the one or more strength members is made of FRP (Fiber Reinforced Plastic), or ARP (Aramid Reinforced Plastic).

18. The optical fiber cable as claimed in claim 14, wherein the one or more strength members is coated with EAA (Ethylene Acrylic Acid) or EVA (Ethylene-Vinyl Acetate) coating.

19. The optical fiber cable as claimed in claim 1, wherein the first layer is a colored layer.

20. The optical fiber cable as claimed in claim 1, wherein the second layer is applied on the first layer before wrapping or applied during a wrapping process.

* * * * *